US007243060B2

(12) United States Patent
Atlas et al.

(10) Patent No.: US 7,243,060 B2
(45) Date of Patent: Jul. 10, 2007

(54) SINGLE CHANNEL SOUND SEPARATION

(75) Inventors: Les Atlas, Seattle, WA (US); Jeffrey Thompson, Bothell, WA (US)

(73) Assignee: University of Washington, Seattle, WA (US)

( * ) Notice: Subject to any disclaimer, the term of this patent is extended or adjusted under 35 U.S.C. 154(b) by 985 days.

(21) Appl. No.: 10/406,802

(22) Filed: Apr. 2, 2003

(65) Prior Publication Data

US 2003/0185411 A1 Oct. 2, 2003

Related U.S. Application Data

(60) Provisional application No. 60/369,432, filed on Apr. 2, 2002.

(51) Int. Cl.
*G10L 11/00* (2006.01)
*G10L 21/00* (2006.01)
*G10L 15/20* (2006.01)

(52) U.S. Cl. ........................ 704/200; 704/270; 704/233

(58) Field of Classification Search ..................... None
See application file for complete search history.

(56) References Cited

U.S. PATENT DOCUMENTS

| | | | | |
|---|---|---|---|---|
| 6,321,200 B1 * | 11/2001 | Casey | ........................ | 704/500 |
| 6,430,528 B1 * | 8/2002 | Jourjine et al. | ............. | 704/200 |
| 6,910,013 B2 * | 6/2005 | Allegro et al. | .............. | 704/256 |
| 7,076,433 B2 * | 7/2006 | Ito et al. | ..................... | 704/500 |
| 2002/0176353 A1 | 11/2002 | Atlas et al. | ................. | 370/203 |

OTHER PUBLICATIONS

Vinton et al., "Scalable and progressive audio codec", IEEE International Conference on Acoustics, Speech, and Signal Processing, 2001, pp. 3277-3280, vol. 5.*

Greenberg et al., "The modulation spectrogram: in pursuit of an invariant representation of speech", International Conference on Acoustics, Speech, and Signal Processing, 1997, pp. 1647-1650, vol. 3.*

Amari, Shun-Ichi and Andrzej Cichocki. 1998. "Adaptive Blind Signal Processing—Neural Network Approaches." *Proceedings of the IEEE*:86 (October): 2026-48.

Bregman, Albert S. 1990. *Auditory Scene Analysis: The Perceptual Organization of Sound.* The MIT Press.

Beauvois, Michael W. and Ray Meddis. 1991. "A Computer Model of Auditory Stream Segregation." *The Quarterly Journal of Experimental Psychology*: 43A(3):517-41.

Cardoso, Jean-Francois. 1998. "Blind Signal Separation: Statistical Principles." *Proceedings of the IEEE*:86 (October):2009-25.

Choi, Seungjin and Andrzej Cichocki. n.d. Adaptive Blind Separation of Speech Signals: Cocktail Party Problem. Frontier Research Program, RIKEN, Saitama, Japan: 6pp.

(Continued)

*Primary Examiner*—David Hudspeth
*Assistant Examiner*—Brian L. Albertalli
(74) *Attorney, Agent, or Firm*—Ronald M. Anderson

(57) ABSTRACT

The speech of two or more simultaneous speakers (or other simultaneous sounds) conveyed in a single channel are distinguished. Joint acoustic/modulation frequency analysis and display tools are used to localize and separate sonorant portions of multiple-speakers' speech into distinct regions using invertible transform functions. For example, the regions representing one of the speakers are set to zero, and the inverted modified display maintains only the speech of the other speaker. A combined audio signal is manipulated using a base acoustic transform, followed by a second modulation transform, which separates the combined signals into distinguishable components. The components corresponding to the undesired speaker are masked, leaving only the second modulation transform of the desired speaker's audio signal. An inverse second modulation transform of the desired signal is performed, followed by an inverse base acoustic transform of the desired signal, providing an audio signal for only the desired speaker.

29 Claims, 7 Drawing Sheets

OTHER PUBLICATIONS

Girolami, M. n.d. Noise Reduction and Speech Enhancement via Temporal Anti-Hebbian Learning. University of Paisley, Scotland:4pp.

Koutras, Athanasios, Evangelos Dermatas, and George Kokkinakis. Recognizing Simultaneous Speech: A Genetic Algorithm Approach. University of Patras, Hellas, Cyprus. 4pp.

Lee, Te-Won, Anthony J. Bell, Russell H. Lambert. n.d. Blind separation of delayed and convolved sources. 7pp.

MacDougall-Shackleton, Scott A., Stewart H. Hulse, Timothy Q. Gentner, and Wesley White. 1998. Auditory scene analysis by European starlings (*Sturnus vulgaris*): Perceptual segregation of tone sequences. *J. Acoust. Soc. Am.*: 103(6)(June):3581:87.

Meyer, G.F., F. Plante, and F. Berthommier. 1997. "Segregation of Concurrent Speech with the Reassigned Spectrum." *IEEE*:1203-06.

Parsons, Thomas W. 1976. "Separation of speech from interfering speech by means of harmonic selection." *J. Acoust. Soc. Am.*:60/4(October):911-18.

Westner, Alex and V. Michael Bove, Jr. n.d. Applying Blind Source Separation and Deconvolution to Real-World Acoustic Environments. MIT Media Lab:10pp.

Yen, Kuan-Chieh, Jun Huang, Yunxin Zhao. n.d. Co-Channel Speech Separation in the Presence of Correlated and Uncorrelated Noises. University of Illinois Urbana-Champaign. 4pp.

Yen, Kuan-Chieh and Yunxin Zhao. n.d. Co-Channel Speech Separation for Robust Automatic Speech Recognition: Stability and Efficiency. University of Illinois Urbana-Champaign. 4pp.

* cited by examiner

SINGLE CHANNEL SOUND SEPARATION

RELATED APPLICATIONS

This application is based on a prior copending provisional application Ser. No. 60/369,432, filed on Apr. 2, 2002, the benefit of the filing date of which is hereby claimed under 35 U.S.C. § 119(e).

FIELD OF THE INVENTION

The present invention relates generally to speech processing, and more particularly, to distinguishing the individual speech of simultaneous speakers.

BACKGROUND OF THE INVENTION

Despite many years of intensive efforts by a large research, community, automatic separation of competing or simultaneous speakers is still an unsolved, outstanding problem. Such competing or simultaneous speech commonly occurs in telephony or broadcast situations where either two speakers, or a speaker and some other sound (such as ambient noise) are each simultaneously received by the same channel. To date, efforts that exploit speech-specific information to reduce the effects of multiple speaker interference have been largely unsuccessful. For example, the assumptions of past blind signal separation approaches often are not applicable in normal speaking and telephony environments.

The extreme difficulty that automated systems face in dealing with competing sound sources stands in stark contrast to the remarkable ease with which humans and most animals perceive and parse complex, overlapping auditory events in their surrounding world of sounds. This facility, known as auditory scene analysis, has recently been the focus of intensive research and mathematical modeling, which has yielded fascinating insights into the properties of the acoustic features and cues that humans automatically utilize to distinguish between simultaneous speakers.

A related yet more general problem occurs when the competing sound source is not speech, but is instead arbitrary yet distinct from the desired sound source. For example, when on location recording for a movie or news program, the sonic environment is often not as quiet as would be ideal. During sound production, it would be useful to have available methods that allow for the reduction of undesired background or ambient sounds, while maintaining desired sounds, such as dialog.

The problem of speaker separation is also called "co-channel speech interference." One prior art approach to the co-channel speech interference problem is blind signal separation (BSS), which approximately recovers unknown signals or "sources" from their observed mixtures. Typically, such mixtures are acquired by a number of sensors, where each sensor receives a different combination of the source signals. The term "blind" is employed, because the only a priori knowledge of the signals is their statistical independence. An article by J. Cardoso ("Blind Signal Separation: Statistical Principles" *IEEE Proceedings,* Vol. 86, No 10, October 1998, pp. 2009-2025) describes the technique.

In general, BSS is based on the hypothesis that the source signals are stochastically mutually independent. The article by Cardoso noted above, and a related article by S. Amari and A. Cichocki ("Adaptive Blind Signal Processing-Neural Network Approaches," *IEEE Proceedings,* Vol. 86, No 10, October 1998, pp. 2026-2048) provide heuristic algorithms for BSS of speech. Such algorithms have originated from traditional signal processing theory, and from various other backgrounds such as neural networks, information theory, statistics, system theory, and information theory. However, most such algorithms deal with the instantaneous mixture of sources and only a few methods examine the situation of convolutive mixtures of speech signals. The case of instantaneous mixture is the simplest case of BSS and can be encountered when multiple speakers are talking simultaneously in an anechoic room with no reverberation effects and sound reflections. However, when dealing with real room acoustics (i.e., in a broadcast studio, over a speakerphone, or even in a phone booth), the effect of reverberation is significant. Depending upon the amount and the type of the room noise, and the strength of the reverberation, the resulting speech signals that are received by the microphones may be highly distorted, which will significantly reduce the ability of such prior art speech separation algorithms.

To quote a recent experimental study: " . . . reverberation and room noise considerably degrade the performance of BSSD (blind source separation and deconvolution) algorithms. Since current BSSD algorithms are so sensitive to the environments in which they are used, they will only perform reliably in acoustically treated spaces devoid of persistent noises." (A. Westner and V. M. Bove, Jr., "Applying Blind Source Separation and Deconvolution to Real-World Acoustic Environments," *Proc. 106th Audio Engineering Society (AES) Convention,* 1999.)

Thus, BSS techniques, while representing an area of active research, have not produced successful results when applied to speech recognition under co-channel speech interference. In addition, BSS requires more than one microphone, which often is not practical in most broadcast and telephony speech recognition applications. It would be desirable to provide a technique capable of solving the problem of simultaneous speakers, which requires only one microphone, and which is inherently less sensitive to non-ideal room reverberation and noise.

Therefore, neither the currently popular single microphone nor known multiple microphone approaches, which have been proven successful for addressing mild acoustic distortion, have provided satisfactory solutions for dealing with difficult co-channel speech interference and long-delay acoustic reverberation problems. Some of the inherent infrastructure of the existing state-of-the-art speech recognizers, which requires relatively short, fixed-frame feature inputs or which requires prior statistical information about the interference sources, is responsible for this current challenge.

If automatic speech recognition (ASR) systems, speakerphones, or enhancement systems for the hearing impaired are to become truly comparable to human performance, they must be able to segregate multiple speakers and focus on one among many, to "fill in" missing speech information interrupted by brief bursts of noise, and to tolerate changing patterns of reverberation due to different room acoustics. Humans with normal hearing are often able to accomplish these feats through remarkable perceptual processes known collectively as auditory scene analysis. The mechanisms that give rise to such an ability are an amalgam of relatively well-known bottom-up sound processing stages in the early and central auditory system, and less understood top-down attention phenomena involving whole brain function. It would be desirable to provide ASR techniques capable of solving the simultaneous speaker problem noted above. It would further be desirable to provide ASR techniques capable of solving the simultaneous speaker problem modeled at least in part, on auditory scene analysis.

Preferably, such techniques should be usable in conjunction with existing ASR systems. It would thus be desirable to provide enhancement preprocessors that can be used to process input signals into existing ASR systems. Such techniques should be language independent and capable of separating different, non-speech sounds, such as multiple musical instruments, in a single channel.

SUMMARY OF THE INVENTION

The present invention is directed to a method for recovering an audio signal produced by a desired source from an audio channel in which audio signals from a plurality of different sources are combined. The method includes the steps of processing the audio channel with a joint acoustic modulation frequency algorithm to separate audio signals from the plurality of different sources into distinguishable components. Next, each distinguishable component corresponding to any source that is not desired in the audio channel is masked, so that the distinguishable component corresponding to the desired source remains unmasked. The distinguishable component that is unmasked is then processed with an inverse joint acoustic modulation frequency algorithm, to recover the audio signal produced by the desired source.

The step of processing the audio channel with the joint acoustic modulation frequency algorithm preferably includes the steps of applying a base acoustic transform to the audio channel and applying a second modulation transform to the result.

The step of processing the distinguishable component that is unmasked with an inverse joint acoustic modulation frequency algorithm includes the steps of applying an inverse second modulation transform to the distinguishable component that is unmasked and applying an inverse base acoustic transform to the result.

The base acoustic transform separates the audio channel into a magnitude spectrogram and a phase spectrogram. Accordingly, the second modulation transform converts the magnitude spectrogram and the phase spectrogram into a magnitude joint frequency plane and a phase joint frequency plane. Masking each distinguishable component is implemented by providing a magnitude mask and a phase mask for each distinguishable component corresponding to any source that is not desired. Using each magnitude mask, a point-by-point multiplication is performed on the magnitude joint frequency plane, producing a modified magnitude joint frequency plane. Similarly, using each phase mask, a point-by-point addition on the phase joint frequency plane is performed, producing a modified phase joint frequency plane. Note that while a point-by-point operation is performed on both the magnitude joint frequency plane and the phase joint frequency plane, different types of operations are performed.

The step of processing the distinguishable component that is unmasked with an inverse joint acoustic modulation frequency algorithm includes the step of performing an inverse second modulation transform on the modified magnitude joint frequency plane, producing a magnitude spectrogram. An inverse second modulation transform is then applied on the modified phase joint frequency plane, producing a phase spectrogram, and an inverse base acoustic transform is applied on the magnitude spectrogram and the phase spectrogram, to recover the audio signal produced by the desired source. Preferably, all of the transforms are executed by a computing device.

In some applications of the present invention, the method will include the step of automatically selecting each distinguishable component corresponding to any source that is not desired. In addition, it may be desirable to enable a user to listen to the audio signal that was recovered, to determine if additional processing is desired. As a further option, the method may include the step of displaying the distinguishable components, and enabling a user to select the distinguishable component that corresponds to the audio signal from the desired source.

As yet another option, before the step of processing the audio channel with the joint acoustic modulation frequency algorithm, the method may include the step of separating the audio channel into a plurality of different analysis windows, such that each portion of the audio channel in an analysis window has relatively constant spectral characteristics. The plurality of different analysis windows are preferably selected such that vocalic and fricative sounds are not present in the same analysis window.

In one application of the present invention, the steps of the method will be implemented as a preprocessor in an automated speech recognition system, so that the audio signal produced by the desired source is recovered for automated speech recognition.

Another aspect of the present invention is directed to a memory medium storing machine instructions for carrying out the steps of the method.

Yet another aspect of the present invention is directed to a system for recovering an audio signal produced by a desired source from an audio channel in which audio signals from a plurality of different sources are combined. The system includes a memory in which are stored a plurality of machine instructions defining a single channel audio separation program. A processor is coupled to the memory, to access the machine instructions, and executes the machine instructions to carry out functions that are generally consistent with the steps of the method discussed above.

Still another aspect of the present invention is directed at processing the audio channel of a hearing aid to recover an audio signal produced by a desired source from undesired background sounds, so that only the audio signal produced by a desired source is amplified by the hearing aid. The steps of such a method are generally consistent with the steps of the method discussed above. A related aspect of the invention is directed to a hearing aid that is configured to execute functions that are generally consistent with the steps of the method discussed above, such that only an audio signal produced by a desired source is amplified by the hearing aid, avoiding the masking effects of undesired sounds.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
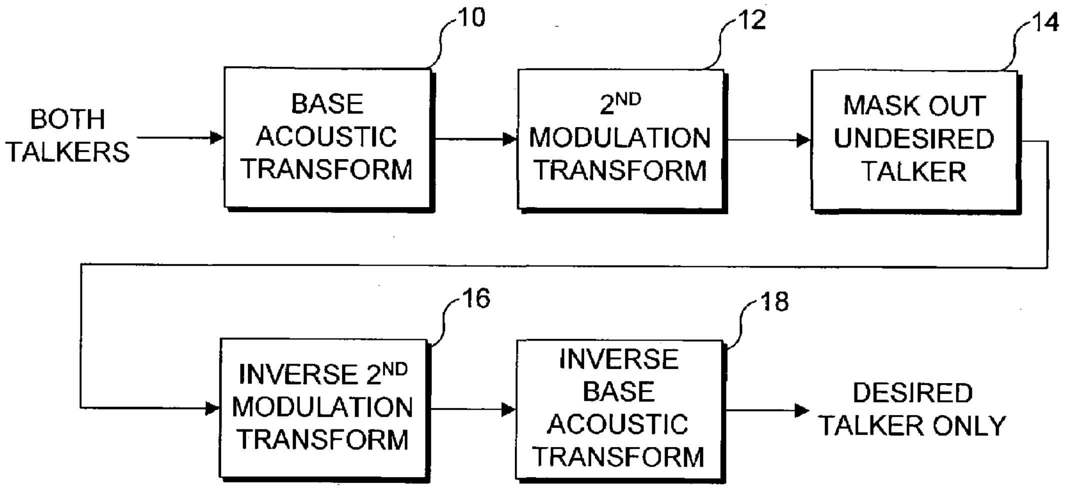
FIG. 1 is a block diagram illustrating the basic steps employed to distinguish between the speech of simultaneous speakers, in accord with the present invention.

FIG. 1 illustrates the overall components of the separation technique employed to distinguish the speech of two or more simultaneous speakers in a single channel in accord with the present invention. While the following description is discussed in the context of speech from two speakers using different languages, it should be understood that the present invention is not limited to separating speech in different languages, and is not even limited solely to separating speech. Indeed, it is contemplated that the present invention will be useful for separating different simultaneous musical or other types of audio signals conveyed in a single channel, where the different signals arise from different sources.

Major features of the present invention include: (1) the ability to separate sounds from only a single channel of data, where this channel has a combination of all sounds to be separated; (2) employing joint acoustic/modulation frequency representations that enable speech from different speakers to be separated into separate regions; (3) the use of high fidelity filtering (analysis/synthesis) in joint acoustic/modulation frequencies to achieve speaker separation preprocessors, which can be integrated with current ASR systems; and (4) the ability to separate audio signals in a single channel that arise from multiple sources, even when such sources are other than human speech.

Referring to FIG. 1, in a block 10, the combined audio signals are manipulated using a base acoustic transform. In a block 12, the combined signals undergo a second modulation transform, which results in separation of the combined audio signals into distinguishable components. In a block 14, the audio signal corresponding to an undesired audio source (such as an interfering speaker) is masked, leaving only a second modulation transform of the desired audio signal. Then, in a block 16, an inverse second modulation transform of the desired (unmasked) audio signal is performed, followed by an inverse base acoustic transform of the desired (unmasked) audio signal in a block 18, resulting in an audio signal corresponding to only the desired speaker (or other audio source).

Joint acoustic/modulation frequency analysis and display tools that localize and separate sonorant portions of multiple-speakers' speech into distinct regions of two-dimensional displays are preferably employed. The underlying representation of these displays will be invertible after arbitrary modification. For example, and most commonly, if the regions representing one of the speakers are set to zero, then the inverted modified display should maintain the speech of only the other speaker. This approach should also be applicable to situations where speech interference can come from music or other non-speech sounds in the background.

In one preferred embodiment, the above technique is implemented using hardware manually controlled by a user. In another preferred embodiment, the technique is implemented using software that automatically controls the process. A working embodiment of a software implementation has been achieved using the signal processing language MATLAB.

Those of ordinary skill in the art will recognize that a joint acoustic/modulation frequency transform can simultaneously show signal energy as a function of acoustic frequency and modulation rate. Since it is possible to arbitrarily modify and invert this transform, the clear separability of the regions of sonorant sounds from different simultaneous speakers can be used to design speaker-separation mask filters.

Figure 2A:
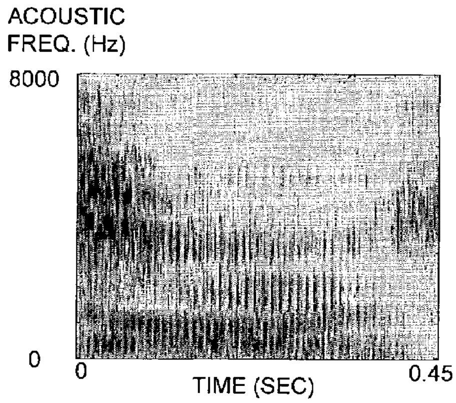
FIG. 2A is a spectrogram of 450 milliseconds of co-channel speech, in which a Speaker A is saying “two” in English, while a Speaker B is simultaneously saying “dos” in Spanish.
Figure 2B:
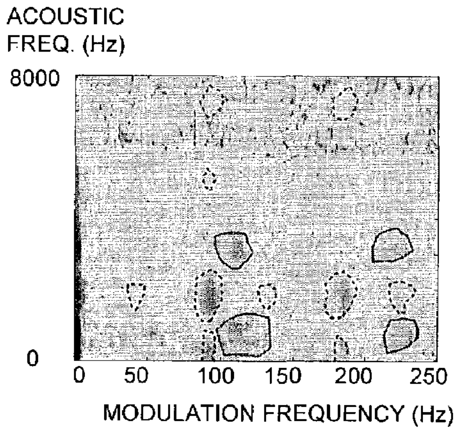
FIG. 2B is a joint acoustic/modulation frequency representation of the 450 milliseconds of co-channel speech of FIG. 2A, with dash lines representing Speaker A's pitch information, and solid lines representing Speaker B's pitch information.

FIGS. 2A-2B show the joint acoustic/modulation frequency transform as applied to co-channel speech that contains simultaneous audio signals of a Speaker A, who is saying "two" in English, and a Speaker B, who is saying "dos" in Spanish. FIG. 2A is a spectrogram of the central 450 milliseconds of "two" (Speaker A) and "dos" (Speaker B) as spoken simultaneously by the two speakers. The spectrogram of FIG. 2A corresponds to the application of a base acoustic transform to the combined audio signals, as described in block 10 of FIG. 1.

FIG. 2B is a joint acoustic/modulation frequency representation of the same 450 milliseconds. The representation of FIG. 2B corresponds to the application of a second modulation transform to the combined audio signals, as described in block 12 of FIG. 1. Note that the y-axis of this Figure represents the standard acoustic frequency. The x-axis of FIG. 2B is modulation frequency, with an assumption of a Fourier basis decomposition.

Thus, the representation of FIG. 2B includes distinct regions for fundamental frequency information for the two speakers. For example, the slightly lower-pitched male English speaker has higher energy regions at about 95 Hz in modulation frequency. The acoustic frequency ranges of this speaker's vocal tract resonances, which are mostly manifest at very low modulation frequencies, are indicated by the acoustic frequency locations of the 95 Hz modulation frequency energy. Similarly, for the male Spanish speaker, whose voice has a fundamental frequency content ranging from about 100 Hz to about 120 Hz, the range of his vocal tract acoustic frequency is separately apparent. FIG. 2B clearly illustrates that the described signal manipulations separate each audio signal (i.e., the signals corresponding to Speaker A and Speaker B) into different regions. Regions bounded by solid lines represent Speaker A's pitch information, while dash lines surround regions representing Speaker B's pitch information.

Once the transforms of blocks 10 and 12 of FIG. 1 are performed, filtering, via a mask, is done on this composite representation to suppress one speaker's voice. Based on the reversibility of the representation, the speech of the two speakers can be separated. This approach is based upon the theory that a complete and invertible representation is possible for a joint representation of acoustic and modulation frequency. Indeed, empirical data show that 45% of listeners rated a music signal that had been reversibly manipulated with the transforms described above as being at least as good in quality as the original digital audio signal.

Figure 3A:
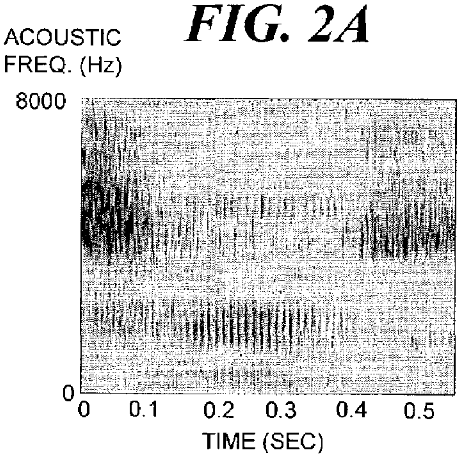
FIG. 3A is a spectrogram of the 450 milliseconds of co-channel speech of FIG. 2A after enhancement of the English language word "two" and the suppression of the Spanish language word "dos;"
Figure 3B:
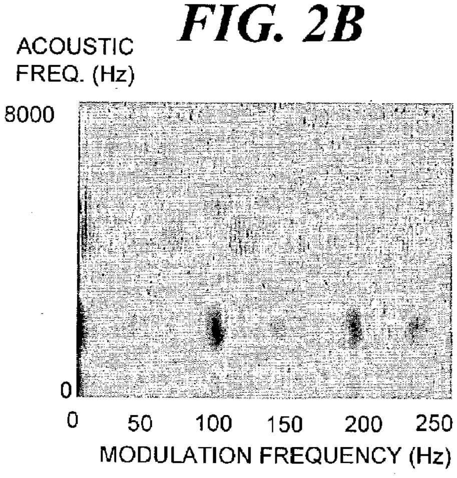
FIG. 3B is a joint acoustic/modulation frequency representation of the 450 milliseconds of co-channel speech of FIG. 3A, showing only Speaker A's pitch information, Speaker B's pitch information having been suppressed.

FIGS. 3A-3B show the results of the process illustrated in FIG. 1 as applied to the 450 microsecond audio signal of FIGS. 2A-2B, after the speech of Speaker B has been filtered and masked. FIG. 3A is thus a spectrogram of the central 450 milliseconds of "two" (Speaker A), and FIG. 3B is a acoustic/modulation frequency representation of the same 450 milliseconds, clearly showing that any audio signal corresponding to Speaker B has been substantially removed, leaving only audio corresponding to Speaker A.

One crucial step preceding the computation of this new speech representation based on the concept of modulation frequency is to track the relatively stationary portions of the speech spectrum over the entire sentence. This tracking will provide appropriate analysis windows over which the representation will be minimally "smeared" by the speech acoustics with varying spectral characteristics. For example, as shown by the above example, it is preferable not to mix vocalic and fricative sounds in the same analysis window.

Figure 4:
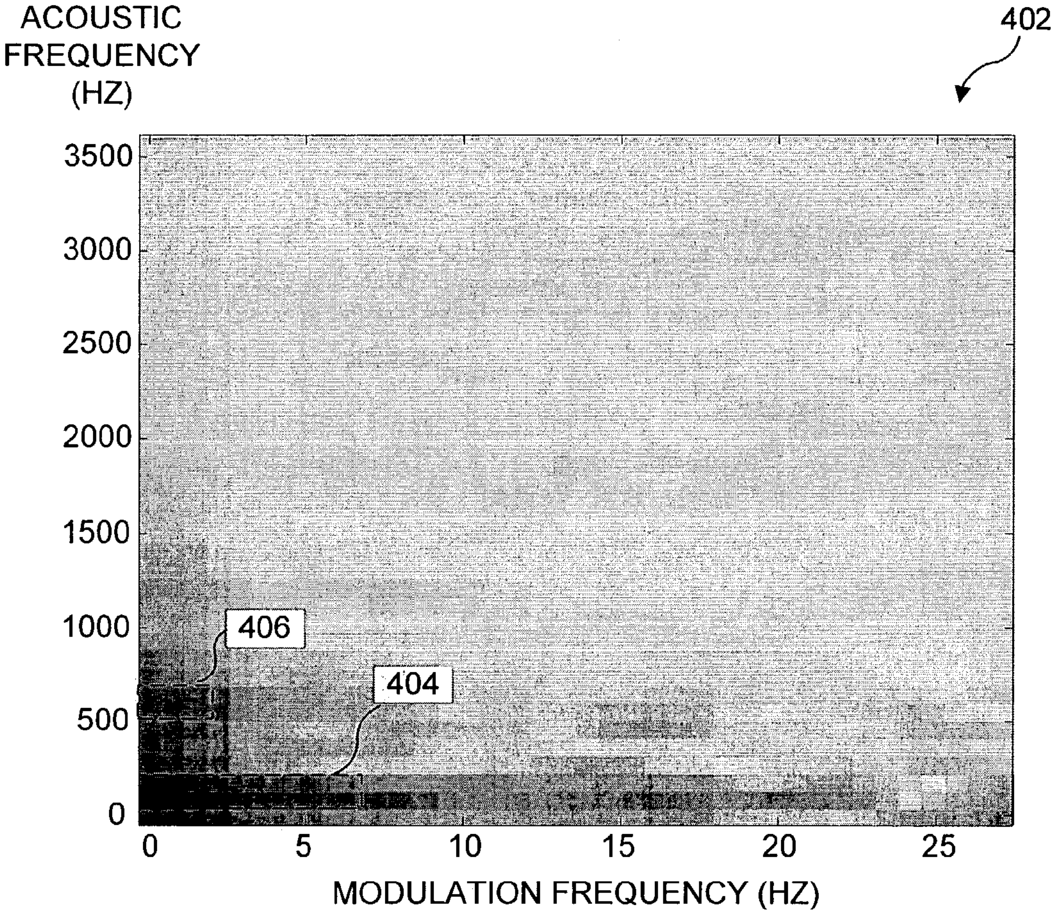
FIG. 4 is a joint acoustic/modulation frequency representation of the of the first 300 milliseconds of a speech dialog passage, which is corrupted by generator noise, as indicated by dashed lines.

As noted above, the present invention facilitates the separation and removal of undesired noise interference from speech recordings. Empirical data indicates that the present invention provides superior noise reduction when compared to existing, conventional techniques. FIG. 4 schematically illustrates the present invention being utilized to remove background generator noise from speech.

FIG. 4 shows a joint acoustic/modulation frequency representation 402 of the first 300 milliseconds of a speech dialog passage, which is corrupted by generator noise. Dashed boxes 404 and 406 surround the portion of frequency representation 402 where the noise source is concentrated. Setting the regions within dashed lines to zero effects the masking operation discussed above with respect to FIG. 1. This masking operation removes almost all noise, while making no perceptible change to the dialog. The darkest portion of joint acoustic/modulation frequency representation 402, which in a color representation would be dark orange, corresponds to the highest energy levels of the signal, and in this case generally corresponds to dashed boxes 404 and 406. Thus, it can be seen that the generator noise source, before processing in accord with the present invention, dominates. The difference after processing is a substantial reduction of noise interference of dialog. Similar results are seen for other types of non-random machinery and electronic noise.

The prior art has focused on the separation of multiple talkers for automatic speech recognition, but not for direct enhancement of an audio signal for human listening. Significantly, prior art techniques do not explicitly maintain any phase information. Further, such prior techniques do not utilize analysis/synthesis formulation, nor employ filtering to allow explicit removal of the undesired sound or speaker, while allowing a playback of the desired sound or speaker. Further, prior techniques have been intended to be applied to synthetic speech, a substantially simpler problem than natural speech.

Figure 5:
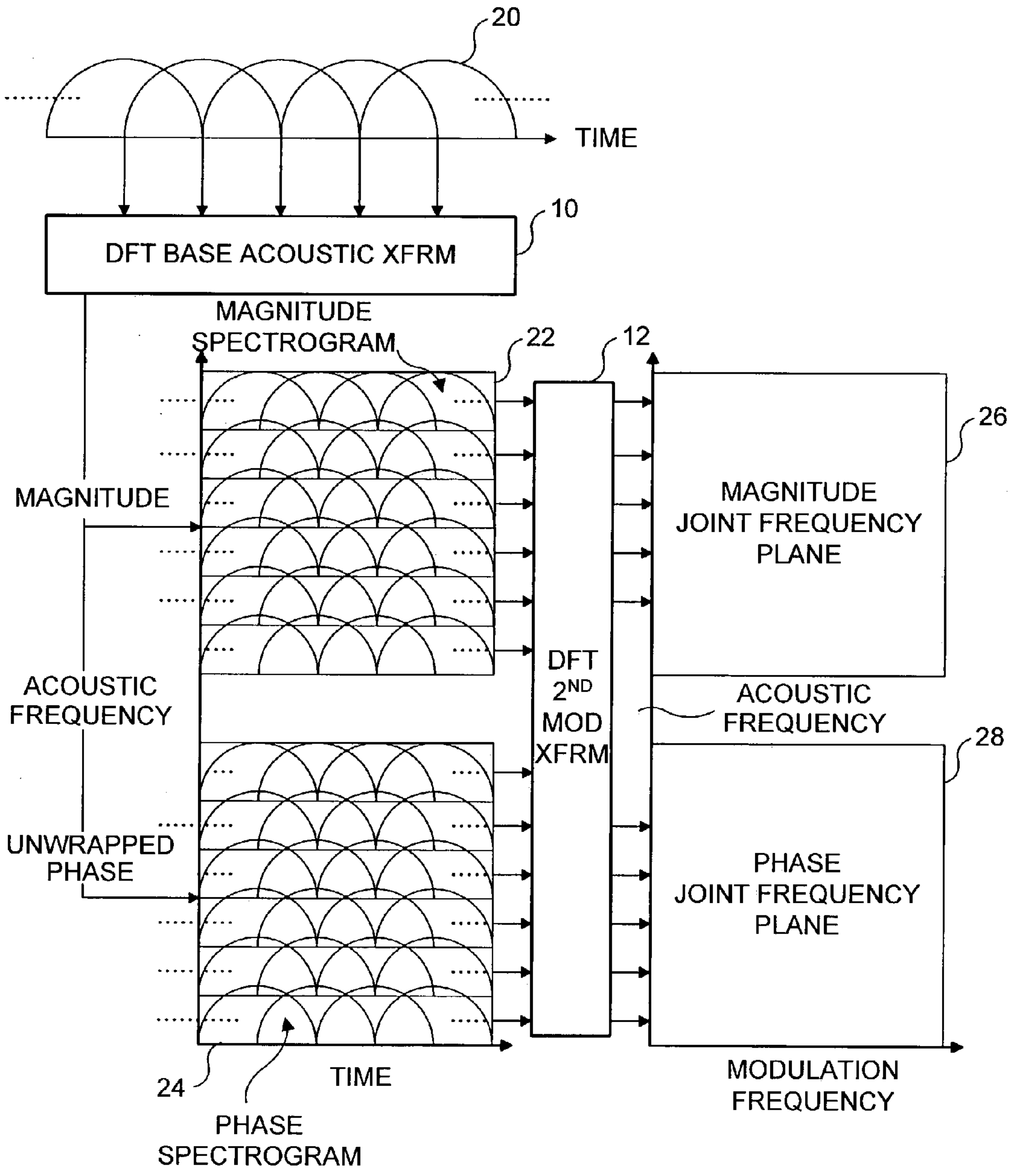
FIG. 5 is a schematic representation of the first two blocks of FIG. 1, and further illustrating that a joint acoustic/modulation frequency phase, useful for speaker separation, is available after the joint acoustic/modulation frequency transform is accomplished.
Figure 6:
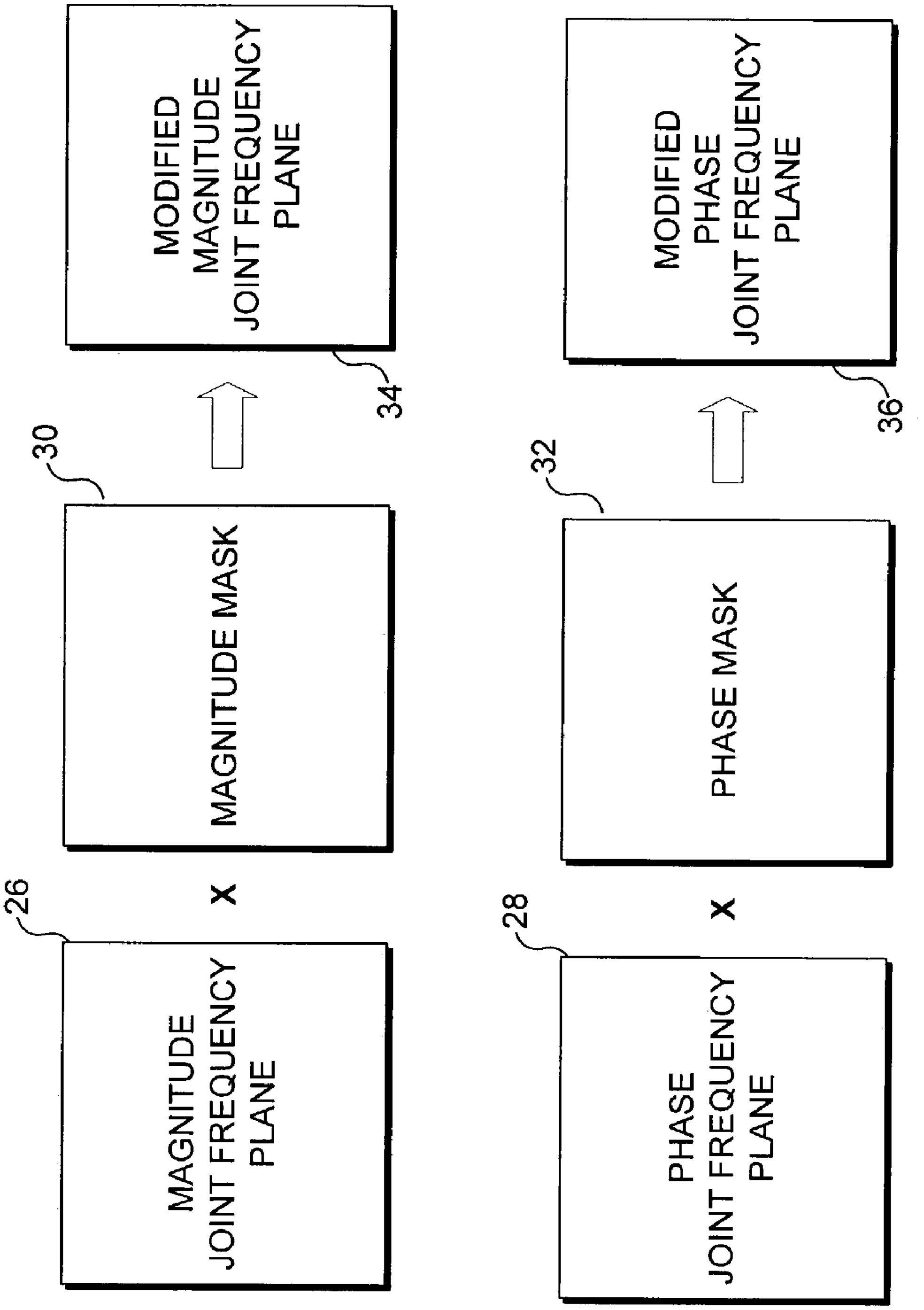
FIG. 6 is a schematic representation of the third block of FIG. 1, indicating that the joint acoustic/modulation frequency masking is accomplished by employing point-by-point operations.
Figure 7:
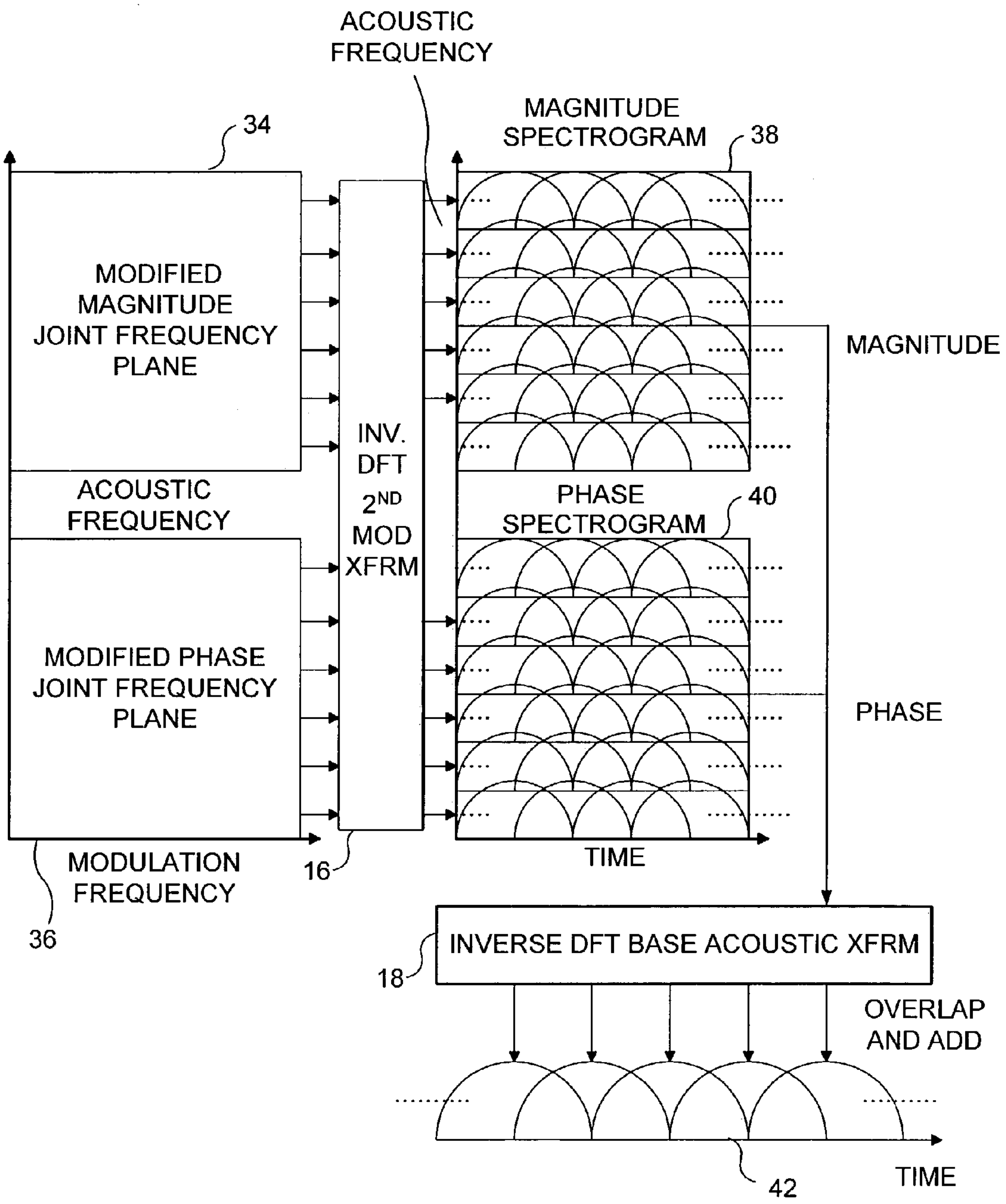
FIG. 7 is a schematic representation of the last two blocks of FIG. 1, illustrating the inverse joint acoustic/modulation frequency transform.

Specific implementations of the present invention are shown in FIGS. 5-7. FIG. 5 is a specific representation of the first two blocks of FIG. 1 (i.e., blocks 10 and 12). The portion of FIG. 4 corresponding to block 10 shows a combined audio signal 20 (including both the speech of Speaker A and Speaker B) undergoing a base acoustic transform in block 10 that separates signal 20 into a magnitude spectrum 22 and a phase spectrum 24. The Figure shows the spectrum, with time as the x-axis and acoustic frequency as the y-axis. Note that the spectrums of FIGS. 2A and 3A illustrate that both the magnitude and frequency spectrums of FIG. 4 overlap each other. Once the spectrums are generated by the base acoustic transform, each spectrum is further manipulated using the second modulation transform in block 12, to generate a magnitude joint frequency plane 26 and a phase joint frequency plane 28. Each plane is defined with modulation frequency as its x-axis and acoustic frequency as its y-axis. The representation of FIG. 2B illustrates that both the magnitude and phase planes shown in FIG. 5 overlap each other.

FIG. 6 provides additional detail about block 14 of FIG. 1, in which the undesired speaker is masked from the combined signal. A magnitude mask 30 and a phase mask 32 are required. A point-by-point multiplication is performed on magnitude joint frequency plane 26 using magnitude mask 30, producing a modified magnitude joint frequency plane 34. At the same time, a point-by-point addition is performed on phase joint frequency plane 28 using phase mask 32, producing a modified phase joint frequency plane 36. The mask employed determines whether Speaker A or Speaker B is removed. As noted above, the point-by-point operation performed on the magnitude joint frequency plane is point-by-point multiplication, while the point-by-point operation performed on the phase joint frequency plane is a point-by-point addition.

FIG. 7 provides additional detail about blocks 16 and 18 of FIG. 1, in which the respective inverses of the transforms of blocks 10 and 12 are performed to reconstruct the audio signal in which one of the two combined signals (i.e., either Speaker A or Speaker B) has been removed. Modified phase joint frequency plane 36 and modified magnitude joint frequency plane 34 (filtered and masked as per FIG. 6) undergo the inverse of the second modulation transform in block 16 to generate a magnitude spectrogram 38 and a phase spectrogram 40. As described above, each spectrogram has time as its x-axis and acoustic frequency as its y-axis. The spectrograms are then manipulated using the inverse base transform in block 18, to reconstruct an audio signal 42 from which substantially all of the unwanted speaker's speech has been removed.

Figure 8A:
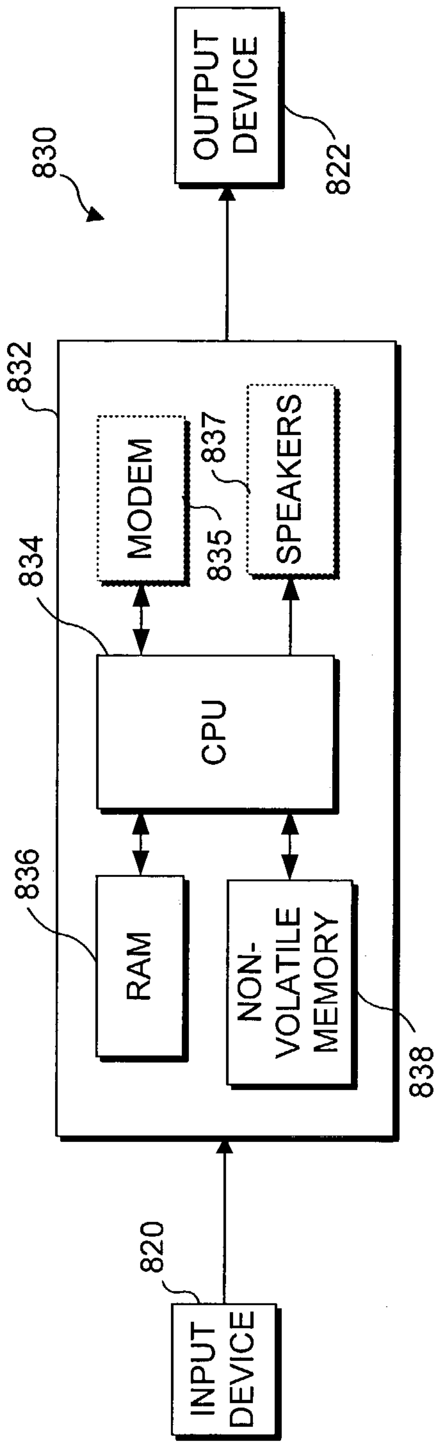
FIG. 8A is a block diagram of an exemplary computing device that can be used to implement the present invention.

FIG. 8A, and the following related discussion, are intended to provide a brief, general description of a suitable computing environment for practicing the present invention. In a preferred embodiment of the present invention, a single channel sound separation application is executed on a personal computer (PC). Those skilled in the art will appreciate that the present invention may be practiced with other computing devices, including a laptop and other portable computers, multiprocessor systems, networked computers, mainframe computers, hand-held computers, personal data assistants (PDAs), and on devices that include a processor, a memory, and a display. An exemplary computing system

830 that is suitable for implementing the present invention includes a processing unit 832 that is functionally coupled to an input device 820, and an output device 822, e.g., a display. Processing unit 832 includes a central processing unit (CPU) 834 that executes machine instructions comprising an audio recognition application and the machine instructions for implementing the additional functions that are described herein. Those of ordinary skill in the art will recognize that CPUs suitable for this purpose are available from Intel Corporation, AMD Corporation, Motorola Corporation, and other sources.

Also included in processing unit 832 are a random access memory (RAM) 836 and non-volatile memory 838, which typically includes read only memory (ROM) and some form of memory storage, such as a hard drive, optical drive, etc. These memory devices are bi-directionally coupled to CPU 834. Such storage devices are well known in the art. Machine instructions and data are temporarily loaded into RAM 836 from non-volatile memory 838. Also stored in memory are operating system software and ancillary software. While not separately shown, it should be understood that a power supply is required to provide the electrical power needed to energize computing system 830.

Preferably, computing system 830 includes speakers 837. While these components are not strictly required in a functional computing system, their inclusion facilitates use computing system 830 in connection with implementing many of the features of the present invention. Speakers enable a user to listen to changes in an audio signal as a result of the single channel sound separation techniques of the present invention. A modem 835 is often available in computing systems, and is useful for importing or exporting data via a network connection or telephone line. As shown, modem 835 and speakers 837 are components that are internal to processing unit 832; however, such units can be, and often are, provided as external peripheral devices.

Input device 820 can be any device or mechanism that enables input to the operating environment executed by the CPU. Such an input device(s) include, but are not limited to a mouse, keyboard, microphone, pointing device, or touchpad. Although, in a preferred embodiment, human interaction with input device 820 is necessary, it is contemplated that the present invention can be modified to receive input electronically. Output device 822 generally includes any device that produces output information perceptible to a user, but will most typically comprise a monitor or computer display designed for human perception of output. However, it is contemplated that present invention can be modified so that the system's output is an electronic signal, or adapted to interact with external systems. Accordingly, the conventional computer keyboard and computer display of the preferred embodiments should be considered as exemplary, rather than as limiting in regard to the scope of the present invention.

Figure 8B:
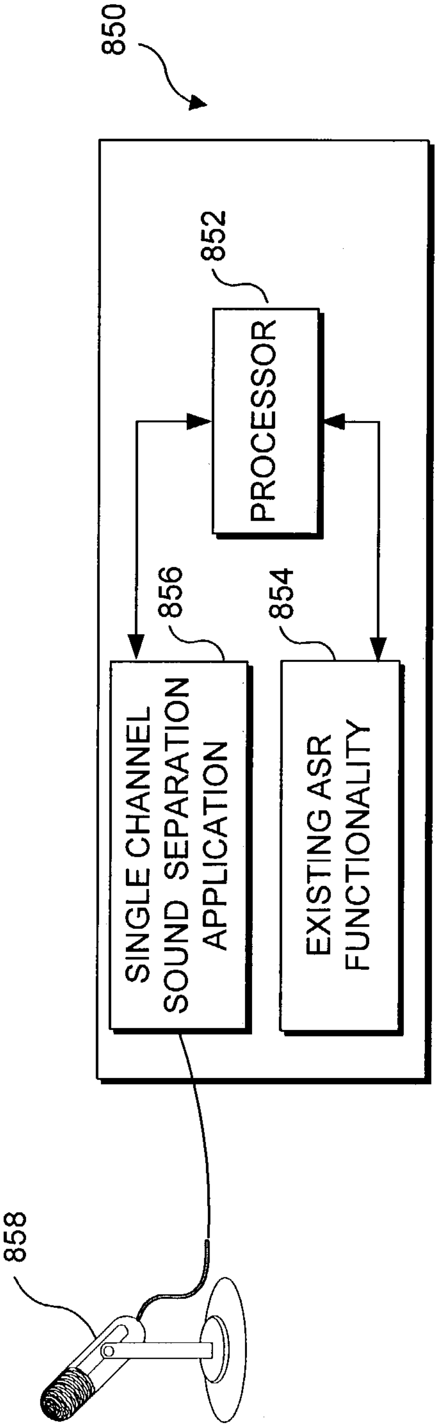
FIG. 8B is a block diagram of an existing ASR system modified to implement the present invention.

As noted above, it is contemplated that the methods of the present invention can be beneficially applied as a preprocessor for existing ASR systems. FIG. 8B schematically illustrates such an existing ASR system 850, which includes a processor 852 capable of providing existing ASR functionality, as indicated by a block 854. The functions of the present invention can be beneficially incorporated (as firmware or software) into ASR system 850, as indicated by a block 856. An audio signal that includes components from different sources, including a speech component, is received by ASR system 850, via an input source such as a microphone 858. The functionality of the present invention, as indicated by block 856, processes the input audio signal to remove components from sources other than the source of the speech component. When the existing ASR functionality indicated by block 854 is applied to the input audio signal preprocessed according to the present invention, a noticeable improvement in the performance of ASR system 850 is expected, as components from sources other than the source of speech will be substantially removed from the input audio signal.

It is contemplated that the present invention can also be beneficially applied to hearing aids. A well-known problem with analog hearing aids is that they amplify sound over the full frequency range of hearing, so low frequency background noise often masks higher frequency speech sounds. To alleviate this problem, manufacturers provided externally accessible "potentiometers" on hearing aids, which, rather like a graphic equalizer on a stereo system, provided the ability to reduce or enhance the gain in different frequency bands to enable distinguishing conversations that would otherwise at least partially be obscured by background noise. Subsequently, programmable hearing aids were developed that included analog circuitry included automatic equalization circuitry. More "potentiometers" could be included, enabling better signal processing to occur. Yet another more recent advance has been the replacement of analog circuitry in hearing aids with digital circuits. Hearing instruments incorporating Digital Signal Processing (DSP), referred to as digital hearing aids, enable even more complex and effective signal processing to be achieved.

Figure 9:
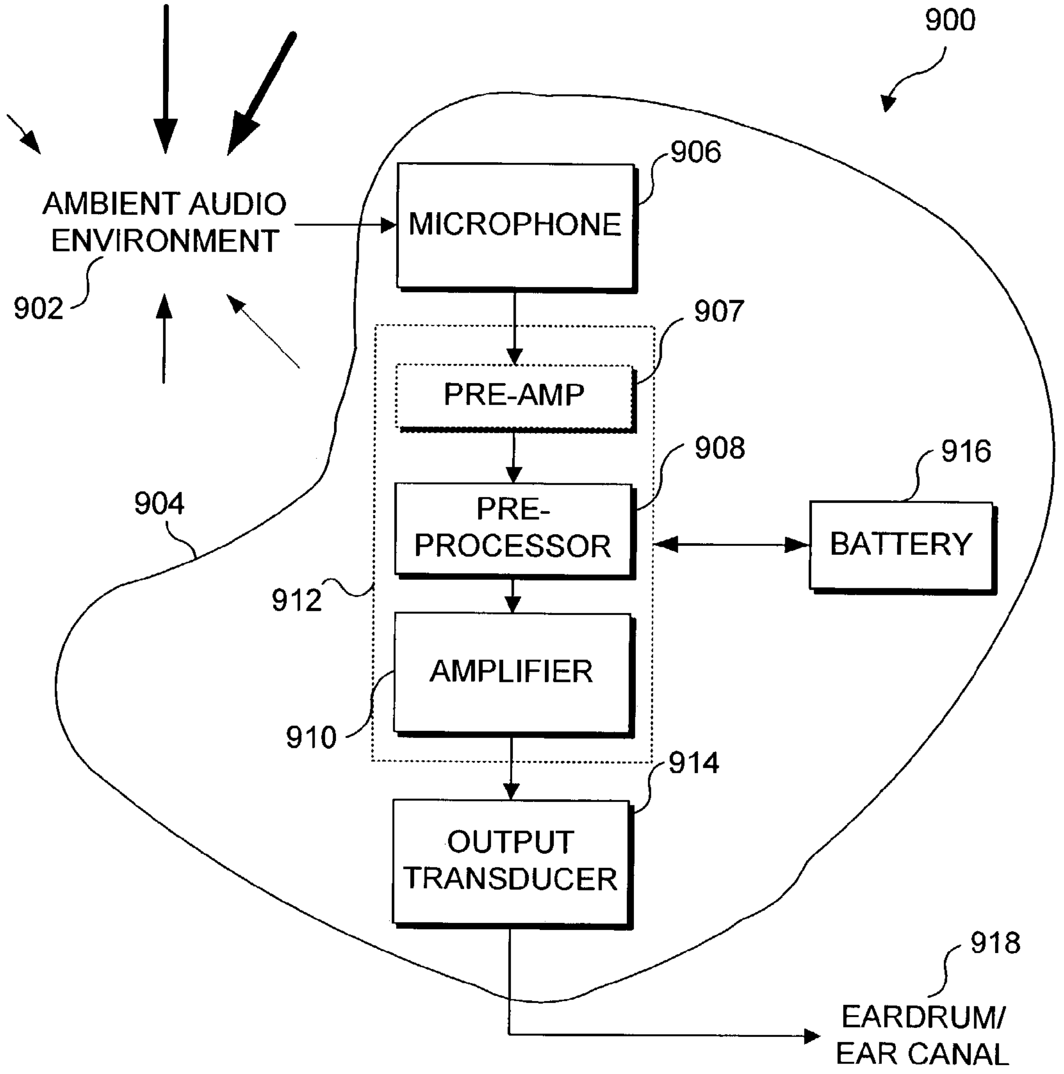
FIG. 9 schematically illustrates a hearing aid implementing the concepts disclosed herein.

It is contemplated that the present invention can beneficially be incorporated into hearing aids to pre-process audio signals, removing portions of the audio signal that do not correspond to speech, and/or removing portions of the audio signal corresponding to a non desired speaker. FIG. 9 schematically illustrates such a hearing aid 900. An audio signal from an ambient audio environment 902 is received by a microphone 906. Ambient audio environment 902 normally includes a plurality of different sources, as indicated by the arrows of different lengths and thicknesses. Microphone 906 is coupled to a pre-processor 908, which provides the functionality of the present invention, just as does block 856 described above. It is expected that the functionality of the present invention will be implemented in hardware, e.g., using an application specific integrated circuit (ASIC). Note that a preamplifier 907 is indicated as an optional element. It is likely that the signal processing to be performed by pre-processor 908 in hearing aid 900 will be more effective if the relatively low voltage audio signal from microphone 906 is pre-amplified before the signal processing occurs.

Once the audio signal from microphone 906 has been processed by pre-processor 908 in accord with the present invention, further processing and current amplification is performed on the audio signal by amplifier 910. It should be understood that the functions performed by amplifier 910 correspond to the amplification and signal processing performed by corresponding circuitry in conventional hearing aids, which implement signal processing to enhance the performance of the hearing aid. Block 912, which encompasses pre-amplifier 907, pre-processor 908 and amplifier 910, indicates that in some embodiments, it is possible that a single component, such as an ASIC, will execute all of the functions provided by each of the individual components.

The fully processed audio signal is sent to an output transducer 914, which generates an audio output that is transmitted to the eardrum/ear canal of the user. Note that hearing aid 900 includes a battery 916, operatively coupled with each of pre-amplifier 907, pre-processor 908 and amplifier 910. A housing 904, generally plastic, substantially encloses microphone 906, pre-amplifier 907, pre-processor 908, amplifier 910, output transducer 914 and battery 916. While housing 904 schematically corresponds to an in-the-ear (ITE) type hearing aid, it should be understood that the present invention can be included in other types of hearing aids, including behind-the-ear (BTE), in-the canal (ITC), and completely-in-the-canal (CIC) hearing aids.

It is expected that sound separation techniques in accord with the present invention will be particularly well suited for integration into hearing aids that already use DSP. In principal however, such sound separation techniques could be used as an add-on to any other type of electronic hearing aid, including analog hearing aids.

With respect to how the sound separation techniques of the present invention can be used in hearing aids, the following applications are contemplated. It should be understood, however, that such applications are merely exemplary, and are not intended to limit the scope of the present invention. The present invention can be employed to separate different speakers, such that for multiple speakers, all but the highest intensity speech sources will be masked. For example, when a hearing impaired person who is wearing hearing aids has dinner in a restaurant (particularly a restaurant that has a large amount of hard surfaces, such as windows), all of the conversations in the restaurant are amplified to some extent, making it very difficult for the hearing impaired person to comprehend the conversation at his or her table. Using the techniques of the present invention, all speech except the highest intensity speech sources can be masked, dramatically reducing the background noise due to conversations at other tables, and amplifying the conversation in the immediate area (i.e. the highest intensity speech). Another hearing aid application would be in the use of the present invention to improve the intelligibility of speech from a single speaker (i.e., a single source) by masking modulation frequencies in the voice of the speaker that are less important for comprehending speech.

The following appendices provide exemplary coding to automatically execute the transforms required to achieve the present invention. Appendix A provides exemplary coding that computes the two-dimensional transform of a given one-dimensional input signal. A Fourier basis is used for the base transform and the modulation transform. Appendix B provides exemplary coding that computes the inverse transforms required to invert the filtered and masked representation to generate a one-dimensional signal that includes the desired audio signal. Finally, Appendix C provides exemplary coding that enables a user to separate combined audio signals in accord with the present invention, including executing the transforms and masking steps described in detail above.

Although the present invention has been described in connection with the preferred form of practicing it and modifications thereto, those of ordinary skill in the art will understand that many other modifications can be made to the invention. Accordingly, it is not intended that the scope of the invention in any way be limited by the above description, but instead be determined entirely by reference to the claims that follow.

APPENDIX A

```
Function
[prevtimeinput,modmagoutput,modphaseoutput,prevmodmaginput,
prevmodphaseinput]=modtransform(timeinput,prevtimeinput,
```

APPENDIX A-continued

```
prevmodmaginput,prevmodphaseinput,basesize,baseoverlap,modsize,
modoverlap)
%MODTRANSFORM
%   This function computes the two-dimensional transform of a
given
%   one-dimensional input signal. A Fourier basis is used for the
%   transforms. The overlap sizes should be 50% or 75% of the
base
%   sizes.
%----- Do a little error checking -----
if
errorcheck(timeinput,prevtimeinput,basesize,baseoverlap,modsize,
modoverlap)
   disp('Error: Bad input parameters!');
   return;
end
% Else no errors - Format input signal
inputsize = size(timeinput);
if inputsize(1) ~= 1
   timeinput = timeinput';                     % Force a row vector
end
previnputsize = size(prevtimeinput);
if previnputsize(1) ~= 1
   prevtimeinput = prevtimeinput';             % Force a row vector
end
%----- Perform the basetransform -----
baseoutput = basetransform(timeinput,prevtimeinput,basesize,
baseoverlap);
%----- Continue to perform a modulation transform -----
[modmagoutput,prevmodmaginput] =
secondtransform(abs(baseoutput),prevmodmaginput,modsize,modoverlap
);
[modphaseoutput,prevmodphaseinput] =
secondtransform(unwrap(angle(baseoutput)),prevmodphaseinput,modsize,
modoverlap);
%---- Get the outputs ready -----
prevtimeinput = timeinput(length(timeinput)-
baseoverlap+1:length(timeinput));
% That's all
%--------------------------------------------------------------------------------------
----------
% BaseTransform subfunction
%--------------------------------------------------------------------------------------
----------
function output = basetransform(input,previnput,basesize,
baseoverlap)
% Concatenate the previnput to the input
input = [previnput input];
% Set up window and output matrix
halfbasesize = basesize/2;
nonoverlap = basesize−baseoverlap;
basewindow = sinewindow(basesize);
blocks = floor((length(input)−baseoverlap)/(nonoverlap));
% Set up for base transform
output = zeros(basesize,blocks);
for n=1:blocks
   output(:,n) = (input((n−1)*(nonoverlap)+1:(n−1)* . . .
      (nonoverlap)+basesize).*basewindow)';
end
% FFT all of the columns
output = fft(output,[ ],1);
output = output(1:halfbasesize+1, :);
%--------------------------------------------------------------------------------------
----------
% Modulation Transform subfunction
%--------------------------------------------------------------------------------------
----------
function [modoutput,prevmodinput] =
secondtransform(input,prevmodinput,modsize,modoverlap)
% Overlap the previous and new input
modinput = [prevmodinput input];
[height width] = size(modinput);
prevmodinput = [prevmodinput(:, (modsize−
modoverlap)+1:size(prevmodinput,2)) input];
% Set up the modulation window
modwindow = repmat(sinewindow(modsize),height,1);
modinput = modinput.*modwindow;
```

APPENDIX A-continued

```
% Transform the time axis of spectrogram – Only keep 0-pi rad
modoutput = fft(modinput,[ ],2);
modoutput = modoutput(:,1:width/2+1);
%-------------------------------------------------------------------------------------------
----------
% Check input parameters for errors
%-------------------------------------------------------------------------------------------
----------
function errors =
errorcheck(input,previnput,basesize,baseoverlap,modsize,modoverlap
)
inputsize = size(input);
previnputsize = size(previnput);
if inputsize(1) ~=1 & inputsize(2) ~=1 & . . .
      previnputsize(1) ~=1 & previnputsize(2) ~=1
   disp('Error: Only 1-dimensional signals are accepted!');
   errors = 1;
   return;
end
% Check that baseoverlap and modoverlap are right sizes
if (baseoverlap/basesize ~= 1/2 & baseoverlap/basesize ~= 3/4) |
. . .
      (modoverlap/modsize ~= 1/2 & modoverlap/modsize ~= 3/4)
   disp('Error: Bad overlap!')
   errors = 1;
   return;
end
% Make sure previnput block is right size
if length(previnput) ~= baseoverlap
   %disp('Error: Bad input block size!');
   errors = 1;
   return;
end
% No errors
errors = 0;
```

APPENDIX B

```
function [output,prevoutput,prevmodmagoutput,prevmodphaseoutput] =
invmodtransform(. . .
         prevtimeinput,modmagoutput,modphaseoutput,prevmodmagoutput,
         prevmodphaseoutput,basesize,baseoverlap,modsize,modoverlap,
         modmagmask)
%INVMODTRANSFORM
%      This function performs an inverse two-dimensional transform
%      and returns a one-dimensional output signal.
%----- Reconstruct the spectogram -----
[modmagoutput,prevmodmagoutput] =
invsecondtransform(modmagoutput,prevmodmagoutput,modsize,
modoverlap)[modphaseoutput,prevmodphaseoutput] =
invsecondtransform(modphaseoutput,prevmodphaseoutput,modsize,
modoverlap);modoutput = modmagoutput.*exp(j*modphaseoutput);
%---- Get the outputs ready -----
% Only take the first part of the output - It is the one that has
been completed
specgramrecon = modoutput(:,1:modsize-modoverlap);
% Set up a temporary vector that is zero-padded to a desired
length
halfbasesize = basesize/2;
nonoverlap = basesize-baseoverlap;
inputsize = size(specgramrecon);
blocks = inputsize(2);        % Blocks is the number of columns
% Set up window and output matrix
window = sinewindow(basesize);
output = zeros(1,(blocks)*(nonoverlap)+baseoverlap);
output(1:baseoverlap) = (½)*prevtimeinput;
% Set up for inverse FFTing
for n=1:blocks
      temp = [specgramrecon(:,n);
```

APPENDIX B-continued

```
conj(flipud(specgramrecon(2:inputsize(1)–1,n)))];
      temp = real(ifft(temp));
      temp = temp'.*window;
      % OLA
      output((n–1)*(nonoverlap)+1:(n–1)*(nonoverlap)+basesize) =
output((n–1)*(nonoverlap)+1:(n–1)*(nonoverlap)+basesize) + temp;
end
output = 2*output;
%figure,plot(output);
%xlabel('Time'),ylabel('Amplitude')
prevoutput = output(length(output)-baseoverlap+1:length(output));
output = output(1:length(output)-baseoverlap);
%----------------------------------------------------------------
----------
% Inverse Modulation Transform subfunction
%----------------------------------------------------------------
----------
function [modoutput,prevmodoutput] =
invsecondtransform(modoutput,prevmodoutput,modsize,modoverlap)
[height width] = size(modoutput);
modoutput = [modoutput conj(fliplr(modoutput(:,2:width-1)))];
modoutput = real(ifft(modoutput,[ ],2));
% OLA: Window all of the data
modwindow = repmat(sinewindow(modsize),height,1);
modoutput = modoutput.*modwindow;
prevmodoutput = [prevmodoutput zeros(height,modsize-modoverlap)];
% Depending on amount of overlap there might be differences in the
reconstruction
switch (modoverlap/modsize)
case (¾)
      scalefactor = ½;
case (½)
      scalefactor = 1;
otherwise
      disp('Error: Bad overlap. Perfect reconstruction not
guaranteed!')
end
prevmodoutput = prevmodoutput+scalefactor*modoutput;
modoutput = prevmodoutput;
prevmodoutput = prevmodoutput(:,(modsize-
modoverlap)+1:size(prevmodoutput,2));
```

APPENDIX C

```
% Script to test modtransforms
clear all, close all, clc
% Create test vector
basesize = 128;
baseoverlap = 96;
modsize = 128;
modoverlap = 96;
orig = cos(2*pi*225/1000*(0:50000));
% Set up all of the buffers
prevtimeinput = zeros(1,baseoverlap);
prevtimeoutput = zeros(1,baseoverlap);
prevmodmaginput = zeros(basesize/2+1,modoverlap);
prevmodmagoutput = zeros(basesize/2+1,modoverlap);
prevmodphaseinput = zeros(basesize/2+1,modoverlap);
prevmodphaseoutput = zeros(basesize/2+1,modoverlap);
inputrecon = [ ];
blocksize = (basesize-baseoverlap)*(modsize-modoverlap);
N = floor(length(orig)/blocksize);
% GO!
for i=1:N
      disp(i)
      block = orig((i–1)*blocksize+1:(i–1)*blocksize+blocksize);
      %----- Forward transform -----
[prevtimeinput,modmagoutput,modphaseoutput,prevmodmaginput,
prevmodphaseinput]=modtransform(block,prevtimeinput,. . .
prevmodmaginput,prevmodphaseinput,basesize,baseoverlap,modsize,mod
overlap);
      %----- Apply the masks -----
      %modmagoutput = modmask_eng(modmagoutput,masknumber);
      figure,imagesc((abs(modmagoutput)));axis xy;colormap(jet)
      xlabel('Modulatlon Frequency (Hz)'), ylabel('Acoustic
```

APPENDIX C-continued

```
Frequency (Hz)'), title('Magnitude Joint Frequency Plane')
    %modphaseoutput = phasemask_eng(modphaseoutput,masknumber);
    figure,imagesc(abs(modphaseoutput));axis xy;colormap(jet)
    xlabel('Modulation Frequency (Hz)'), ylabel('Acoustic
Frequency (Hz)'), title('Phase Joint Frequency Plane')
    pause
    close all
    %----- Inverse transform -----
[tempblock,prevtimeoutput,prevmodmagoutput,prevmodphaseoutput]=inv
modtransform(prevtimeoutput,modmagoutput,modphaseoutput,. . .
prevmodmagoutput,prevmodphaseoutput,basesize,baseoverlap,modsize,
modoverlap,0);%modmagmask);
    inputrecon = [inputrecon tempblock];
end
plot(inputrecon)
```

The invention in which an exclusive right is claimed is defined by the following:

1. A method for recovering an audio signal produced by a desired source from an audio channel in which audio signals from a plurality of different sources are combined, comprising the steps of:

(a) processing the audio channel with a joint acoustic modulation frequency algorithm to separate audio signals from the plurality of different sources into distinguishable components;

(b) masking each distinguishable component corresponding to any source that is not desired in the audio channel, such that the distinguishable component corresponding to the desired source remains unmasked; and (c) processing the distinguishable component that is unmasked with an inverse joint acoustic modulation frequency algorithm, to recover the audio signal produced by the desired source.

2. The method of claim 1, wherein the step of processing the audio channel with the joint acoustic modulation frequency algorithm comprises the steps of:

(a) applying a base acoustic transform to the audio channel; and (b) applying a second modulation transform to a result from applying the base acoustic transform.

3. The method of claim 2, wherein the step of processing the distinguishable component that is unmasked with an inverse joint acoustic modulation frequency algorithm comprises the steps of:

(a) applying an inverse second modulation transform to the distinguishable component that is unmasked; and (b) applying an inverse base acoustic transform to a result of the inverse second modulation transform.

4. The method of claim 2, wherein the base acoustic transform separates the audio channel into a magnitude spectrogram and a phase spectrogram.

5. The method of claim 4, wherein the second modulation transform converts the magnitude spectrogram and the phase spectrogram into a magnitude joint frequency plane and a phase joint frequency plane.

6. The method of claim 5, wherein the step of masking each distinguishable component corresponding to any source that is not desired comprises the steps of:

(a) providing a magnitude mask and a phase mask for each distinguishable component corresponding to any source that is not desired;

(b) using each magnitude mask, performing a point-by-point operation on the magnitude joint frequency plane, thereby producing a modified magnitude joint frequency plane; and (c) using each phase mask, performing a point-by-point operation on the phase joint frequency plane, thereby producing a modified phase joint frequency plane.

7. The method of claim 5, wherein the step of masking each distinguishable component corresponding to any source that is not desired comprises the steps of:

(a) providing a magnitude mask and a phase mask for each distinguishable component corresponding to any source that is not desired;

(b) using each magnitude mask, performing a point-by-point multiplication on the magnitude joint frequency plane, thereby producing a modified magnitude joint frequency plane; and (c) using each phase mask, performing a point-by-point addition on phase joint frequency plane, thereby producing a modified phase joint frequency plane.

8. The method of claim 6, wherein the step of processing the distinguishable component that is unmasked with an inverse joint acoustic modulation frequency algorithm comprises the steps of:

(a) performing an inverse second modulation transform on the modified magnitude joint frequency plane, thereby producing a magnitude spectrogram;

(b) performing an inverse second modulation transform on the modified phase joint frequency plane, thereby producing a phase spectrogram; and (c) performing an inverse base acoustic transform on the magnitude spectrogram and the phase spectrogram, to recover the audio signal produced by the desired source.

9. The method of claim 3, wherein the steps of applying a base acoustic transform, applying a second modulation transform, applying an inverse second modulation transform, and applying an inverse base acoustic transform are executed by a computing device.

10. The method of claim 1, further comprising the step of automatically selecting each distinguishable component corresponding to any source that is not desired.

11. The method of claim 1, further comprising the step of enabling a user to listen to the audio signal that was recovered, to determine if additional processing is desired.

12. The method of claim 2, further comprising the steps of:

(a) displaying the distinguishable components; and (b) enabling a user to select the distinguishable component that corresponds to the audio signal from the desired source.

13. The method of claim 1, wherein before the step of processing the audio channel with the joint acoustic modulation frequency algorithm, further comprising the step of separating the audio channel into a plurality of different analysis windows, such that each portion of the audio channel in an analysis window has relatively constant spectral characteristics.

14. The method of claim 13, wherein the plurality of different analysis windows are selected such that vocalic and fricative sounds are not present in the same analysis window.

15. The method of claim 1, wherein steps (a)-(c) are implemented as a preprocessor in an automated speech recognition system, so that the audio signal produced by the desired source is recovered for automated speech recognition.

16. The method of claim 1, wherein steps (a)-(c) are implemented as a preprocessor in a hearing aid, so that the audio signal produced by the desired source is recovered for amplification.

17. A memory medium storing machine instructions for carrying out the steps of claim 1.

18. A system for recovering an audio signal produced by a desired source from an audio channel in which audio signals from a plurality of different sources are combined, comprising:

(a) a memory in which are stored a plurality of machine instructions defining a single channel audio separation program; and (b) a processor that is coupled to the memory, to access the machine instructions, said processor executing said machine instructions and thereby implementing a plurality of functions, including:

(i) processing the audio channel with a joint acoustic modulation frequency algorithm to separate audio signals from the plurality of different sources into distinguishable components;

(ii) masking each distinguishable component corresponding to any source that is not desired in the audio channel, such that the distinguishable component corresponding to the desired source remains unmasked; and (iii) processing the distinguishable component that is unmasked with an inverse joint acoustic modulation frequency algorithm, to recover the audio signal produced by the desired source.

19. The system of claim 18, wherein the machine instructions further cause said processor to:

(a) apply a base acoustic transform to the audio channel; and (b) apply a second modulation transform to a result from applying the base acoustic transform.

20. The system of claim 19, wherein the machine instructions further cause the processor to:

(a) apply an inverse second modulation transform to the distinguishable component that is unmasked; and (b) apply an inverse base acoustic transform to a result of the inverse second modulation transform.

21. The system of claim 18, further comprising:

(a) a display operatively coupled to the processor and configured to display the distinguishable components; and (b) a user input device operatively coupled to the processor and configured to enable a user to select from the display the distinguishable component that corresponds to the audio signal from the desired source.

22. The system of claim 18, further comprising:

(a) a microphone configured to provide the audio channel in response to an ambient audio environment that includes a plurality of different sources, the microphone being coupled to said processor such that the processor receives the audio channel produced by the microphone;

(b) an amplifier coupled with the processor, such that the amplifier receives the audio signal conveying the desired source from the processor, the amplifier being configured to amplify the audio signal conveying the desired source; and (c) an output transducer coupled with the amplifier such that the output transducer receives the amplified audio signal corresponding to the desired source.

23. The system of claim 22, further comprising a housing substantially enclosing said microphone, said processor, said amplifier, and said output transducer, the housing being configured to be disposed in at least one of:

(a) behind an ear of a user;

(b) within an ear of a user; and (c) within an ear canal of a user.

24. A method for employing a joint acoustic modulation frequency algorithm to separate individual audio signals from different sources that have been combined into a combined audio signal, into distinguishable signals, comprising the steps of:

(a) applying a base acoustic transform to the combined audio signal to separate the combined audio signal into a magnitude spectrogram and a phase spectrogram;

(b) applying a second modulation transform to the magnitude spectrogram and the phase spectrogram, generating a magnitude joint frequency plane and a phase joint frequency plane, such that the individual audio signals from different sources are separated into the distinguishable signals.

25. The method of claim 24, further comprising the steps of:

(a) masking each distinguishable component that is not desired, such that at least one distinguishable component remains unmasked;

(b) applying an inverse second modulation transform to the at least one unmasked distinguishable component; and (c) applying an inverse base acoustic transform to a result of the inverse second modulation transform, producing an audio signal that includes only those audio signals from each different source that is desired.

26. The method of claim 25, wherein the step of masking each distinguishable component that is not desired comprises the steps of:

(a) providing a magnitude mask and a phase mask for each distinguishable component that is not desired;

(b) using each magnitude mask provided, performing a point by point multiplication on the magnitude joint frequency plane, thereby producing a modified magnitude joint frequency plane; and (c) using each phase mask provided, performing a point-by-point addition on the phase joint frequency plane, thereby producing a modified phase joint frequency plane.

27. The method of claim 26, wherein the step of applying the inverse second modulation transform comprises the steps of:

(a) applying the inverse second modulation transform to the modified magnitude joint frequency plane, producing a magnitude spectrogram; and (b) applying the inverse second modulation transform to the modified phase joint frequency plane, producing a phase spectrogram.

28. The method of claim 27, wherein the step of applying the inverse base acoustic transform comprises the step of applying the inverse base acoustic transform to the magnitude spectrogram and the phase spectrogram, producing the audio signals from each different source that is desired.

29. A memory medium storing machine instructions for carrying out the steps of claim 24.

* * * * *